(12) United States Patent
Pezron et al.

(10) Patent No.: US 6,225,380 B1
(45) Date of Patent: May 1, 2001

(54) POLYESTER RESIN-BASED COMPOSITIONS HAVING IMPROVED THICKENING BEHAVIOR

(75) Inventors: Erwoan Pezron, Prairie Village, KS (US); Frederic Bauchet, Kansas City, MO (US)

(73) Assignee: Cook Composites and Polymers Co., Kansas City, MD (US)

( * ) Notice: Subject to any disclaimer, the term of this patent is extended or adjusted under 35 U.S.C. 154(b) by 0 days.

(21) Appl. No.: 09/218,875

(22) Filed: Dec. 22, 1998

Related U.S. Application Data

(60) Provisional application No. 60/068,791, filed on Dec. 24, 1997, and provisional application No. 60/099,161, filed on Sep. 4, 1998.

(51) Int. Cl.$^7$ .................................................. C08L 67/00
(52) U.S. Cl. ............................................................ 523/516
(58) Field of Search ............................................... 523/516

(56) References Cited

U.S. PATENT DOCUMENTS

| | | | |
|---|---|---|---|
| 2,870,113 | 1/1959 | Jones | 260/34.2 |
| 3,008,946 | 11/1961 | Rhodes et al. | 260/94.9 |
| 3,154,530 | 10/1964 | Mullen | 260/94.9 |
| 3,549,586 | 12/1970 | Smith et al. | 260/40 |
| 3,557,042 | 1/1971 | Dalhuisen | 260/31.2 |
| 3,668,178 | 6/1972 | Comstock et al. | 260/40 |
| 3,701,748 | 10/1972 | Kroekel | 260/40 |
| 3,718,714 | 2/1973 | Comstock et al. | 260/862 |
| 3,736,278 | 5/1973 | Wada et al. | 260/22 |
| 3,883,612 | 5/1975 | Pratt et al. | 260/862 |
| 3,909,483 | 9/1975 | Hindersinn et al. | 260/40 R |
| 3,929,868 | 12/1975 | Dombroski et al. | 260/475 P |
| 3,933,757 | 1/1976 | Pratt et al. | 260/75 A |
| 3,971,749 | 7/1976 | Blunt | 260/33.4 PQ |
| 3,986,922 | 10/1976 | Parker et al. | 162/5 |
| 3,988,290 | 10/1976 | Uffner | 260/40 R |
| 3,994,853 | 11/1976 | Hindersinn et al. | 260/40 R |
| 4,035,439 | 7/1977 | Stevenson | 260/859 R |
| 4,067,845 | 1/1978 | Epel et al. | 260/40 R |
| 4,421,894 | 12/1983 | O'Connor et al. | 525/28 |
| 4,427,877 | 1/1984 | Dhingra | 219/548 |
| 4,500,466 | 2/1985 | Hayes et al. | 260/429.9 |
| 4,510,305 | 4/1985 | Korsgen et al. | 528/494 |
| 4,535,110 | 8/1985 | Iseler et al. | 524/196 |
| 4,613,628 | * 9/1986 | Hoshino | 521/72 |
| 4,726,590 | 2/1988 | Molitor | 273/220 |
| 4,837,272 | 6/1989 | Kelley | 525/59 |
| 5,059,511 | * 10/1991 | Higashi | 430/272 |
| 5,096,943 | 3/1992 | Hashimoto et al. | 523/333 |
| 5,166,291 | 11/1992 | Atkins et al. | 523/508 |
| 5,202,366 | 4/1993 | Reid et al. | 523/516 |
| 5,298,562 | 3/1994 | Ceska et al. | 525/244 |
| 5,376,721 | 12/1994 | McGarry et al. | 525/64 |
| 5,516,819 | 5/1996 | Bush et al. | 523/508 |
| 5,589,538 | 12/1996 | Rex et al. | 525/28 |
| 5,629,377 | * 5/1997 | Burgert | 524/832 |
| 5,681,898 | 10/1997 | Pocklington | 525/193 |

FOREIGN PATENT DOCUMENTS 1223465   2/1971   (GB) .............................. C08F/35/00

OTHER PUBLICATIONS

Allen, et al., Comprehensive Polymer Science, The Synthesis, Characterization, Reactions & Applications of Polymers, vol. 7, 1989, p. 66–70.

Marks' Standard Handbook for Mechanical Engineers, Eighth Edition, p. 5–3

\* cited by examiner

*Primary Examiner*—Paul R. Michl
(74) *Attorney, Agent, or Firm*—Whyte Hirschboeck Dudek SC

(57) ABSTRACT

Polyester resin-based molding compositions, and methods for making and using the same, are described which have an improved maturation profile upon addition of a thickening agent. The improved maturation profile results from the presence of at least one multivalent metal salt of a non-fatty acid or anhydride in the molding composition added in accordance with the invention.

10 Claims, No Drawings

POLYESTER RESIN-BASED COMPOSITIONS HAVING IMPROVED THICKENING BEHAVIOR

This application claim benefit to Provisional application 60/068,791 filed Dec. 24, 1997 and claim benefit to Provisional application 60/099,161 filed Sep. 4, 1998.

BACKGROUND OF THE INVENTION

1. Field of the Invention

This invention relates to thermosetting polyester compositions and processes for making molded parts from such compositions. In particular, the present invention relates to the fabrication of molded parts using chemically thickened thermosetting compositions.

2. Description of Related Art

Composite materials are known to have the advantages of high strength, light weight, design flexibility, dimensional stability, corrosion resistance, parts consolidation, better finishing, and low tooling cost over traditional construction materials such as metal, ceramics, and wood. Fiber-reinforced thermosetting polyester composites are widely used in many applications, e.g. marine, automotive, transportation, electrical, construction, consumer and industrial goods, etc. Compared to the composites made from other types of thermosetting resins such as vinyl ester, epoxy, and polyamide, thermosetting polyester composites have the advantages of lower material cost and easy material handling during processing. Therefore, unsaturated polyester resins are the materials of choice for most of the fiber-reinforced thermosetting composites in applications in which the working environment of the composite is not very harsh.

Fiber-reinforced thermosetting polyester composites usually consist of reinforcing (or reinforcement) fibers, either in chopped or continuous form, embedded in a matrix of one or more unsaturated polyester resins. The unsaturated polyester resins are made from a reaction of one or more glycols with an unsaturated dicarboxylic acid or its anhydride, or with a mixture of the unsaturated acid or its anhydride with a saturated dicarboxylic acid or its anhydride. The molecular weight of the polyester is controlled through any conventional means.

In the formation of the matrix, the unsaturated polyester resin is blended typically with (1) one or more monomers capable of crosslinking with the vinyl groups in the polyester, (2) one or more polymerization initiators, (3) promoters for use in combination with the initiator, and (4) various other additives which impart desired characteristics to the matrix upon cure or which will improve the processing and/or curing properties of resin. Such compositions are more fully described in the technical literature, such as in U.S. Pat. Nos. 5,589,538; 5,202,366; 5,516,819; and 4,535,110, which are incorporated herein by reference.

When molding compositions are to be used as sheet molding compositions ("SMCs"), thickening agents are used. Thickening agents increase the viscosity of the molding composition, so that the thickened system is relatively tack free and easy to handle for placing the molding composition in the mold. The thickened composition's high viscosity also helps carry reinforcement fibers to the extremities of the mold when compression is applied to the mold.

Thickening is typically achieved by adding an alkaline material, such as magnesium oxide or hydroxide, to the uncured molding composition. The alkaline material interacts with residual acidity in the polyester resin component to build viscosity. The kinetics of this process are rather slow, requiring several days to achieve a viscosity appropriate for sheet molding operations, which is why the thickening process has been referred to as "maturation". Heat cannot be used to speed up the kinetics, since that would result in premature crosslinking of the molding composition.

A slow maturation process slows down production, requiring more factory space and/or equipment to carry out a given rate of production. It also allows time for premature phase separation to occur between components of the molding composition that are not completely compatible with each other, such as phase separation between the polyester resin(s) solubilized in the monomer and the thermoplastic low profile additives ("LPAs"). Such phase separation cannot be prevented in SMCs by agitation during maturation, because of the presence of the reinforcing fibers. This has either limited the range of component types and amounts that are added to SMCs or has required the addition of compatibilizers, the presence of the latter often having an adverse effect on the physical properties of the resulting molded part.

To achieve a higher maturation rate, the concentration of thickening agent has typically been increased beyond that required to achieve the desired viscosity endpoint, together with providing a sufficient amount of acid end groups on the polyester resin component. A further acceleration of maturation is typically achieved by adding water, which facilitates the thickening reaction. The downside of this approach is that maturation can, and generally will, continue irreversibly to a point at which the viscosity of the molding composition becomes undesirably high. Molding compositions with such high viscosity require high molding pressures, which puts high stresses on the mold. High mold stresses have until now required molds to be made of high strength materials, such as hardened steel, (to avoid deformation of, or damage to, the mold and to reduce wear from repeated use) and also required equipment that can apply high pressure, increasing the capital investment required to make molded parts.

This increase in viscosity over time creates a specific time window within which the molding composition is at a desired viscosity. The more thickening agent is added to speed up maturation, the narrower the time window for the desired viscosity. A narrow time window requires the fabricator to have equipment able to handle significant variations in viscosity from sheet to sheet of SMC due to greater difficulty in accurately predicting when each sheet is ready for molding and the variations in timing between when the thickening agent is added and the part is molded inherent in a typical factory environment.

A factor which has been found to cause significant variability in maturation rate is the presence of varying amounts of water as a contaminant. Water is naturally present in hygroscopic materials such as fillers and may be introduced in trace quantities by the polyester itself, since water is a byproduct of making polyester, and by contact of ingredients with humidity in the atmosphere. Precise control over the amount of water contamination in SMCs is difficult and to some extent impractical. Therefore, there is a degree of unpredictability/variability in the maturation rate from sheet to sheet even if the timing for each sheet were kept the same.

Due to the above variability factors, the fabricator of molded articles has had to use molds and molding equipment with excess capacity to handle potential stress of handling SMCs over a wide range of viscosities ranging far into the high end, where molding is difficult.

There is also a greater risk of scrap if there is down time on the production line, since there is no known way to reverse the maturation process once it has gone too far, and even with higher amounts of thickening agent, the initial maturation rate is generally still too slow to prevent premature phase separation of incompatible or noncompatibilized components.

There is thus a desire to achieve a high rate of viscosity increase in the beginning of maturation followed by a relatively long time window in which viscosity remains within a desired range for fabrication into the molded part.

There is also the desire for molding compositions which can incorporate components that tend to form a separate phase in the uncured SMC.

There is especially a desire in the art for SMCs that predictably reach a viscosity plateau at lower viscosities, because such SMCs would lend themselves to use with less expensive, easier to fabricate molds and molding under lower temperature and pressure conditions.

These and other objectives are surprisingly achieved by the present invention.

SUMMARY OF THE INVENTION

According to one aspect of this invention, polyester resin-based molding compositions are provided which comprise:

(A) at least one unsaturated polyester resin having an acid number of at least about 10;

(B) at least one ethylenically unsaturated monomer copolymerizable with the unsaturated polyester resin;

(C) at least one thickening agent comprising an oxide or hydroxide of a Group I, II or III metal; and (D) at least one multivalent metal salt of a non-fatty acid or anhydride.

Another aspect of this invention provides a process for producing a molded part comprising:

(A) forming one of the above-described polyester-based curable molding compositions into a desired shape in a mold under an elevated pressure and (B) heating the formed composition in the mold to an elevated temperature.

Yet another aspect of this invention provides a method for controlling maturation of polyester resin-based molding compositions having an unsaturated polyester resin in which at least about 25% of the end groups are acidic, an ethylenically unsaturated monomer copolymerizable with the unsaturated polyester resin and a thickening agent comprising an oxide or hydroxide of a Group I, II or III metal comprising dispersing in the molding composition at least one multivalent metal salt of a non-fatty acid or anhydride.

The present invention provides a unique solution to the problems associated with the maturation profile of conventional uncured SMCs. This solution is described in more detail below.

Unless stated otherwise, all parts, percents and ratios are by weight.

Viscosity is in Poise measured at a sample temperature of 32° C. using a Brookfield Model HBT viscometer mounted on a heliopath having a T-bar spindle. The heliopath is operated such that the T-bar spindle moves continuously solely in one direction along the axis of rotation (preferably downward) over the time period during which the viscosity measurement is being taken. The T-bar spindle is selected from one of types/sizes T-A through T-F, depending on the viscosity of the sample being tested, such that viscosity is measured within the optimum measurement range of the viscometer (preferably within 50% from the middle of the measurement range to the end of the measurement range at either end). This may require measurement with more than one spindle to determine the correct spindle type. The rate of spindle rotation during viscosity measurement is 5 rotations per minute (R.P.M.).

DESCRIPTION OF THE PREFERRED EMBODIMENTS

1. Unsaturated Polyester Resins

The unsaturated polyester resins used in the invention are known in the art. Preferred resins are those with a molecular weight/double bond or vinyl group (—C=C—) factor between about 150 and about 190, more preferably between about 155 and about 170 (as further described in U.S. Pat. No. 3,701,748 which is incorporated herein by reference). These resins are made from a reaction of one or more polyols with an unsaturated dicarboxylic acid or its anhydride or with a mixture of the unsaturated acid or its anhydride with a saturated dicarboxylic acid or its anhydride. A specific example is STYPOL® 40-2783 available from Cook Composites and Polymers.

The unsaturated dicarboxylic acid or its anhydrides used in the preparation of the unsaturated polyester include those that contain olefinic unsaturation, preferably when the olefinic unsaturation is alpha, beta- to at least one of the carboxylic acid groups. Such acids and anhydrides include maleic acid or anhydride, fumaric acid, citraconic acid, mesaconic acid, methyl maleic acid, and itaconic acid, and mixtures thereof. Maleic acid or anhydride, and fumaric acid, are preferred.

A minor proportion of the unsaturated acid, up to about 30 mole percent, can be replaced by one or more saturated and/or aromatic dicarboxylic acids or anhydrides. Examples include phthalic acid or anhydride, isophthalic acid, terephthalic acid, tetrahydrophthalic anhydride, succinic acid, adipic acid, sebacic acid, and dimerized fatty acids, and mixtures thereof.

Polyols used in the preparation of the unsaturated polyesters include ethylene glycol, diethylene glycol, triethylene glycol, propylene glycol, dipropylene glycol, tripropylene glycol, butylene glycols, neopentyl glycol, 1,3- and 1,4-butane diols, 1,5-pentane diol, 1,6-hexanediol, glycerol, 1,1,1-trimethylolpropane, bisphenol A, hydrogenated bisphenol A, and other polyols, and mixtures thereof. Diols, and in particular glycols, are preferred.

The reaction mixture may also include dicyclopentadiene ("DCPD") to modify, as described in U.S. Pat. No. 3,883,612 and U.S. Pat. No. 3,933,757 (both of which are incorporated herein by reference), the molecular weight of the polyesters. The unsaturated polyester resin typically has a number average molecular weight in the range from about 500 to about 5,000, preferably in the range from about 700 to about 3,500.

Polyesters that are employed in thickened molding compositions contain residual acidity in order to enter into the thickening reaction. Preferably, the polyester resin has an acid number of at least about 10, or preferably at least about 25% of its end groups are acid (i.e., carboxylic monomer end units). Such polyester resins and how to make them, including the DCPD modified resins, are described in U.S. Pat. No. 3,933,757 and U.S. Pat. No. 3,883,612, which are incorporated herein by reference.

This component is present in the SMCs of this invention in an amount in the range from 5 to 40, preferably 10 to 30, percent, by weight, based on the weight of the SMC.

2. Ethylenically Unsaturated Monomer

Any ethylenically unsaturated monomer that will copolymerize with the vinyl groups of the unsaturated polyester resin can be used in the practice of this invention. These monomers include such materials as styrene, vinyl toluene, p-methyl styrene, chlorostyrene, t-butyl styrene, diallyl phthalate, mono- or multifunctional lower alkyl esters of the acrylic or methacrylic acids such as methyl methacrylate and glycol diacrylate, and the like. Styrene is the reactive monomer of choice.

The SMCs of this invention may further contain at least one highly reactive olefinically unsaturated crosslinkable monomer, such as those described in U.S. Pat. No. 5,202,366, which is incorporated herein by reference. An example of a preferred crosslinkable monomer is divinyl benzene.

The amount of monomer component ranges between about 30 to about 70 percent, preferably between about 40 to about 60 percent, by weight, based on the combined weight of the monomer, the unsaturated polyester resin and any LPA. When the amount of monomer is based on the weight of the SMC, the amount is preferably in the range from about 7 to about 20 wt %. The monomer is preferably added in an amount that will dissolve all or most of the unsaturated polyester resin component at room temperature.

3. Thickening Agent

Thickening agents are known in the art. They include oxides and hydroxides of the metals of Group I, II and III of the Periodic Table, especially Group IIA. Preferred metals include magnesium, calcium, zinc and barium. Specific examples include magnesium oxide, calcium oxide, zinc oxide, barium oxide, magnesium hydroxide, and calcium hydroxide, and mixtures thereof. Magnesium oxide and hydroxide, for example, are available for use in SMC formulations from various commercial sources, such as Barcroft Company.

The total amount of thickening agent in the SMCs of this invention is preferably present in an amount in the range from about 0.1 to 5, more preferably from about 0.1 to about 2, percent, by weight, based on the weight of the SMC.

A dual thickening system can be also employed in which the above described metal oxides and/or hydroxides are used together with a polyisocyanate as described in Belgian Patent 849,135 and U.S. Pat. Nos. 4,067,845 and 4,535,110, which are incorporated herein by reference.

4. Multivalent Salt of a Nonfatty Acid or Anhydride

The multivalent metal salt of a nonfatty acid or anhydride has been surprisingly found to increase the initial maturation rate (i.e., maturation within one hour of addition and dispersal of thickening agent) without increasing the long term maturation rate (i.e., maturation within 100 hours of addition and dispersal of thickening agent). In a preferred aspect of this invention, the presence of this multivalent metal salt according to this invention reduces the long term maturation rate relative to the corresponding composition not containing this component.

A further surprising aspect of this invention is that the maturation rate of SMCs containing this component is less sensitive to the presence of water than compositions not containing this component, providing even greater viscosity control. The SMCs of this invention can tolerate up to 0.1 wt. %, more preferably up to 0.3 wt. %, water, and in preferred embodiments up to 0.1 wt. %, preferably up to 0.3 wt. %, change in the amount of water in the SMCs of this invention causes less than 10%, more preferably less than 5%, change in viscosity measured at 100 hours after addition of thickening agent.

Yet a further surprising aspect of this invention is that the viscosity at which the maturation rate of SMCs reaches a plateau can be adjusted by adjusting the amount of this component in the SMCs of this invention. That ability facilitates the ability to use the SMC at a lower temperature and/or pressure, which in turn permits the use of less expensive molds made of materials that are more easily manufactured. Molds made of soft steel, rather than the hardened steel used in conventional fabrication of articles from SMCs, may be used, as well as molds made of aluminum and/or composite materials. Preferred temperatures and pressures for use of such molds are described under the process and method description below.

The term "nonfatty carboxylic acid or anhydride" means a carboxylic acid or anhydride that has ten or less aliphatic carbon atoms in a single aliphatic moiety. The nonfatty carboxylic acid or anhydride preferably has from two to six, more preferably two, carbon atoms attached to the acid group. The acid or anhydride may be saturated or unsaturated, including ethylenically unsaturated.

The multivalent metal may be any metal having a valence of two or more, such as those in Groups IIA, IIB, and III of the Periodic Table. Preferred examples include $Zn^{2+}$, $Mg^{2+}$ or $Ca^{2+}$, or a combination thereof.

Preferred examples of this metal salt may be represented by the formula:

$$M_{c1}^{c2+}(R(C(O)O)_{a1}^{31})_{a2} \quad (I)$$

wherein $M^{c2+}$ represents a multivalent metal cation having a valence of c2, R is a hydrocarbyl moiety having up to 10, more preferably from 2 to 6, carbon atoms, c1, c2, a1 and a2 are positive integers, and the product of c1 and c2 equals the product of a1 and a2. Examples of preferred metal salts are zinc diacrylate and zinc dimethacrylate.

The multivalent metal salts for use in the SMCs of this invention are well known and available from commercial sources. Particularly preferred is a zinc diacrylate powder made by Sartomer Company under the designation SR 705 in which 50 wt % of the zinc diacrylate particles have a particle size less than 10 microns.

In one embodiment, the multivalent metal salt is dispersed in the composition as finely divided particles. Preferably, at least 50 wt % of the finely divided particles have a particle size less than 5 microns, more preferably less than 2 microns.

In another preferred aspect of this invention, the weight ratio of the multivalent metal salt component to thickening agent component is at least about 0.5:1, more preferably at least about 1:1, and even more preferably at least about 2:1. There is no specific upper limit to this weight ratio, but weight ratios of up to about 10:1, more preferably up to about 8:1, and even more preferably up to about 7:1, are useful in obtaining the objectives of this invention. The amount of the multivalent metal salt is preferably in the range from 0.2 to 10, more preferably in the range from 0.5 to 5, percent, by weight, based on the weight of the SMC. The multivalent metal salt may be added before, during or after the addition of thickening agent to the make the SMC, preferably before or during.

5. Low Profile Additives ("LPAs")

The SMCs of this invention preferably contain at least one LPA. LPAs for SMCs are well known in the art of making SMCs. The thermoplastic polymers used as LPAs may be those that are miscible with the polyester resin and reactive monomer, such that upon blending one with the others a one-phase matrix precursor is formed, or may be noncompatible LPAs. Examples of compatible LPAs include poly (vinyl acetate) ("PVAC"), such as the NEULON® series of PVAs from Union Carbide Chemicals and Plastics Technology Corporation (e.g., NEULON® 9005, NEULON® 8000 and NEULON® G); thermoplastic copolymers containing at least 50 wt % vinyl acetate; polyester urethanes; cellulose acetate butyrate ("CAB"), and various saturated polyesters, such as STYPOL® 40-0125 from Cook Composites and Polymers, Inc. Examples of noncompatible LPAs include polyethylene, poly(methyl methacrylate) ("PMMA"), polystyrene, such as STYPOL® 40-0087 from Cook Composites and Polymers, Inc.; polycaprolactones; polyvinyl chloride; butadiene; and block copolymers of styrene and butadiene, which may be used with or without a compatibilizer. Examples of compatibilized LPAs are described in U.S. Pat. No. 5,376,721, which is incorporated herein by reference. The weight average molecular weight of these LPAs can range from about 3,000 to about 1,000,000, preferably from about 5,000 to about 500,000. The amount of optional LPA present in the matrix precursor ranges between about 0 to about 20 percent, preferably between about 3 to about 15 percent, by weight.

Suitable vinyl acetate LPAs are described in U.S. Pat. No. 3,718,714. Suitable polyurethane LPAs are described in U.S. Pat. Nos. 4,035,439 and 4,421,894. Suitable carboxylated polyester LPAs prepared from cyclic esters are described in U.S. Pat. Nos. 3,549,586 and 3,668,178. Suitable saturated polyester LPAs are described in U.S. Pat. Nos. 3,909,483; 3,994,853; 3,736,278; and 3,929,868. All the foregoing patents describing LPAs are incorporated herein by reference.

6. Additional Components

A certain amount of filler may optionally be added to the SMC. Acceptable fillers include natural or precipitated calcium carbonates, clay, silica, talc, mica, and hydrated alumina. If present, the amount of filler added to the SMC is typically up to about 70 percent, preferably up to about 50 percent, and preferably at least about 20 percent, by weight, based on the total weight of the SMC.

A certain amount of reinforcing material may optionally be added, such as glass fibers or fabrics, carbon fibers or fabrics, aramide fibers or fabrics, polypropylene, acrylonitrile/vinyl chloride copolymers, PAN fibers and fabrics. The fibers may be in the form of a mat or roving, such as fiberglass roving having a short (e.g., 1–2 inch) length. If present, the amount of reinforcing material added to the SMC is typically up to 60 percent, more preferably up to 50 percent, and preferably at least about 10 percent, by weight, based on the total weight of the SMC.

The SMC is cured through the action of one or more polymerization initiators. Polymerization initiators are generally free radical initiators, such as an organic peroxide compound, e.g. t-butyl perbenzoate, benzoyl peroxide, cumene hydroperoxide, t-butyl peroctoate, methyl ethyl ketone peroxide, and others known in the art. When the polymerization initiator is heat-activated, the polymerization initiator is selected to have a free radical initiating temperature within the elevated temperature range used in the process for making a molded article described below. The minimum amount of such initiator used is a initiating amount, and typical amounts present in the SMC range from about 0.1 to about 5, more preferably 0.1 to 2, percent by weight, based on the weight of the SMC.

Other materials that can be present in the SMC include polymerization inhibitors, accelerators, pigments, release agents and other types of additives to improve the processing and/or curing properties of the resin, and/or which impart one or more desired features to the composite. These other materials are used in known amounts and in known ways.

Particularly, other types of additives may include at least one polymer additive having low surface tension. The at least one polymer additive preferably has a melting temperature or glass transition temperature less than the upper limit of an elevated temperature range described under the "Process and Method" description below, more preferably less than 150° C. The at least one polymer additive is preferably substantially uncrosslinked, and is preferably in the form of a powder, more preferably in the form of a micronized powder. The weight content of this polymer additive in the SMC is in the range from 0 to 20, preferably 1 to 10 parts, by weight per 100 parts by weight of the sum of all organic components of the SMC. The organic components include, without limitation, the at least one unsaturated polyester resin (A), the at least one ethylenically unsaturated monomer (B) and optional LPA.

Preferably, the at least one polymer additive comprises, more preferably consists essentially of, at least one polyolefin, such as at least one polyethylene or ethylene copolymer, and/or at least one fluorinated polymer, which are preferably in powder (i.e., finely divided) form as described above. Processes for making finely divided polyolefins are described in U.S. Pat. Nos. 2,870,113; 3,008,0946; 3,154,530; 3,971,749 and 4,510,305, which are incorporated herein by reference. Specific examples of commercially available finely divided solid polyolefins include MICROTHENE™ available from Millenium Petrochemicals Inc. of Cincinnati, Ohio (USA) and COATHYLENE™ available from Herberts Polymer Powders S.A. of Bulle, Switzerland.

7. Process and Method

Another aspect of this invention is a process for producing a molded part comprising:

(A) forming a polyester-based curable molding composition of this invention into a desired shape in a mold under an elevated pressure and (B) heating the formed composition in the mold at an elevated temperature.

The elevated pressure is defined as a positive pressure differential between the SMC and the inner contours of the mold such that the SMC is forced to conform to the contours of the mold. That pressure is preferably less than about 2000 Psi, more preferably less than 1000 Psi, more preferably less than 500 Psi, even more preferably less 300 Psi and even more preferably less than 200 Psi. The minimum pressure is generally the pressure required to fully conform the SMC to the contours of the mold, among other factors that are routinely optimized by the molded article fabricator.

The elevated temperature is used both to further soften the SMC to conform it to the mold and the peak temperature is intended cure the SMC by initiating and promoting crosslinking. Due to the lower plateau of viscosity of the SMCs of this invention, the SMCs may be heated to lower temperatures to achieve these objectives. The elevated temperature is preferably not greater than about 400° F. (204 C.), more preferably not greater than about 350° F. (177 C.), even more preferably not greater than about 300° F. (149 C.), and even more preferably not greater than about 200° F. (93 C.). In one embodiment, the elevated temperature is at least 150° F. (65 C.) and in another embodiment the elevated temperature is at least 170° F. (77 C.), which may depend on the temperature required for heat-activated polymerization initiation, the desired viscosity of the SMC, etc. Another important aspect of this invention is that it comprises a method for controlling maturation of polyester resin-based molding compositions having an unsaturated polyester resin in which at least about 25% of the end groups are acidic, an ethylenically unsaturated monomer copolymerizable with the unsaturated polyester resin and a thickening agent comprising an oxide or hydroxide of a Group I, II or III metal comprising dispersing in the molding composition at least one multivalent metal salt of a nonfatty acid or anhydride. Preferably, the metal salt is added to the molding composition prior to, or simultaneously with, the addition of the thickening agent.

The viscosity of the SMC of this invention at the time of adding thickening agent is typically in the range between about 100 to about 1000 Poise preferably between about 150 to about 500 Poise. The viscosity of the molding composition one hour after addition of the thickening agent is preferably at least 50%, more preferably at least 100%, greater than the same composition after maturation for the same amount of time without the metal salt.

The viscosity of the molding composition 100 hours after addition of the thickening agent is also preferably not greater than about 160,000 Poise, more preferably not greater than about 120,000 Poise, and even more preferably not greater than about 80,000 Poise. The viscosity of the molding composition 720 hours (i.e., one month) after addition of the thickening agent is also preferably not greater than 800,000 Poise.

The SMC of this invention has a time frame in which the viscosity remains within a desired lower viscosity range which is longer than the time frame for the same composition without the metal salt. In a preferred embodiment, the SMC of this invention has a viscosity of not more than about 320,000, more preferably not more than about 240,000, even more preferably not more than 160,000 Poise when 120, more preferably 240, even more preferably 360 hours have passed since addition of the thickening agent.

The gel time of the SMCs of this invention will vary with, among other things, the compositional nature of the SMC and the cure conditions, but it is preferably between about 10 seconds to about 10 minutes at the elevated temperature described above.

The invention is further described by the following examples. All parts, percents and ratios are by weight unless otherwise indicated. Viscosity is in Poise measured at 32° C. using a Brookfield viscometer as previously described above.

SPECIFIC EMBODIMENTS

SMC formulations are prepared according to the present invention and compared with comparative SMC formulations. The formulations presented in Tables 1A and 2A below are made without reinforcing fibers to facilitate measuring the viscosity of the SMC formulations. Data on the viscosity of those formulations over time is presented in Tables 1B to 1D for the Table 1A formulations and in Tables 2B to 2D for the Table 2A formulations.

TABLE 1A

Formulations for Tables 1B, 1C and 1D

Parts by Weight of Components in SMC Formulations

| Component | C-1 | C-2 | A-1 | A-2 | B-1 | B-2 | C-3 | D | C-4 | E |
|---|---|---|---|---|---|---|---|---|---|---|
| STYPOL ® 40-2783 | 60 | 60 | 60 | 60 | 60 | 60 | 60 | 60 | 60 | 60 |
| Polyvinyl Acetate LPA | 40 | 40 | 40 | 40 | 40 | 40 | — | — | — | — |
| Polyester Urethane LPA | — | — | — | — | — | — | 40 | 40 | — | — |
| Polystyrene LPA | — | — | — | — | — | — | — | — | 40 | 40 |
| Zinc Stearate | 4.5 | 4.5 | 4.5 | 4.5 | 4.5 | 4.5 | 4.5 | 4.5 | 4.5 | 4.5 |
| BYK 996 | 2 | 2 | 2 | 2 | 2 | 2 | 2 | 2 | 2 | 2 |
| Additional Styrene Monomer | 7 | 7 | 7 | 7 | 7 | 7 | — | — | 7 | 7 |
| Sartomer SR 705 | — | — | 3 | 3 | 7 | 7 | — | 7 | — | 7 |
| CaCO$_3$ Filler | 160 | 160 | 160 | 160 | 160 | 160 | 170 | 170 | 170 | 170 |
| MgO | 1 | — | 1 | — | 1 | — | 1 | 1 | 1 | 1 |
| MgO/Mg(OH)$_2$ Blend | — | 1 | — | 1 | — | 1 | — | — | — | — |

STYPOL® 40-2783 is an unsaturated polyester resin made by Cook Composites and Polymers, Inc., which is a reaction product of propylene glycol and maleic anhydride, dissolved in styrene at a resin to styrene weight ratio in the range from 68:32 to 70:30.

The polyvinyl acetate LPA is NEULON® G available from Union Carbide Chemicals and Plastics Technology Corporation.

The polystyrene LPA is STYPOL® 40-0087 available from Cook Composites and Polymers, Inc.

BYK 996 is a dispersant available from Byk Chemie.

Sartomer SR705 is a zinc diacrylate powder made by the Sartomer Company.

MgO is a magnesium oxide powder available from Barcroft Company.

All of the components except MgO or MgO/Mg(OH)$_2$ blend are mixed prior to adding MgO or MgO/Mg(OH)$_2$ blend, respectively. Then the MgO or MgO/Mg(OH)$_2$ blend is added and mixed to make the respective SMC compositions and the viscosity is measured immediately, then after 1 hour, for the data in Tables 1B and 1C, again after 24 hours, again after 48 hours, for the data in Table 1C again after 72 hours, and for the data in Tables 1B and 1C again after 96 hours. The results are shown in Tables 1B, 1C and 1D below. Viscosity at zero hours is defined as the viscosity just after mixing and addition of MgO. "Elapsed Time" refers to time measured from when MgO or MgO/Mg(OH)$_2$ blend, respectively, is added and dispersed in the respective formulation. The abbreviation "pbw" refers to "parts by weight" and unless stated otherwise "pbw" refers to "parts by weight metal salt".

Table 1B below shows three SMC formulations in which the thickening agent is MgO. Formulation C-1 is comparative and formulations A-1 and B-1 are prepared according to the present invention.

TABLE 1B

Viscosity Over Time of Formulations Containing MgO in the Presence of Varying Amounts of Metal Salt

| | Viscosity of Formulations in Poise @ 32° C. | | |
|---|---|---|---|
| Elapsed Time in Hours | C-1 (0 pbw) | A-1 (3 pbw) | B-1 (7 pbw) |
| 0 | 240 | 640 | 752 |
| 1 | 1,024 | 3,250 | 2,700 |
| 24 | 180,000 | 71,000 | 20,000 |
| 48 | 200,000 | 160,000 | 82,000 |
| 96 | 200,000 | 150,000 | 82,000 |

As can be seen from the above data, SMC formulations A-1 and B-1 containing 3 and 7 parts by weight (pbw) metal salt (zinc diacrylate), respectively, according to the present invention have an initial viscosity more than twice that of comparative formulation C-1 containing the same ingredients except for the metal salt. The SMC formulation B-1 containing 7 pbw metal salt has a viscosity after 96 hours which is substantially less than the same SMC formulation after 96 hours containing 3 pbw metal salt, A-1. Formulation A-1 also has a viscosity after 96 hours that is substantially less than that of comparative formulation C-1 without the metal salt. Overall, this data shows that the addition of the metal salt to the SMC formulation accelerates initial maturation and then reduces the long term maturation rate, increasing the time period during which the SMC formulation may be molded under the desired lower pressure and temperature conditions. This provides a wider moldability window at a significantly lower viscosity and permits making molded articles at lower temperatures and pressures than those used in conventional SMC molding, which in turn allows for less expensive materials to be used in fabricating the mold.

Table 1C below shows three SMC formulations in which the thickening agent is $Mg(OH)_2$. Formulation C-2 is comparative and formulations A-1 and B-2 are prepared according to the present invention.

TABLE 1C

Viscosity Over Time of Formulations Containing $Mg(OH)_2$ in the Presence of Varying Amounts of Metal Salt

| | Viscosity of Formulations in Poise @ 32° C. | | |
|---|---|---|---|
| Elapsed Time in Hours | C-2 (0 pbw) | A-2 (3 pbw) | B-2 (7 pbw) |
| 0 | 240 | 656 | 816 |
| 1 | 720 | 2,100 | 2,000 |
| 24 | 150,000 | 100,000 | 24,000 |
| 48 | 170,000 | 120,000 | 40,000 |
| 72 | 190,000 | 150,000 | 68,000 |
| 96 | 210,000 | 160,000 | 92,000 |

As with the data in Table 1B based on MgO as the thickening agent, the addition of the metal salt to the SMC formulations based on $Mg(OH)_2$ as the thickening agent accelerates initial maturation and then reduces the long term maturation rate, increasing the time period during which the SMC formulation may be molded under the desired lower pressure and temperature conditions.

Table 1D below provides data on three SMC formulations of the present invention, each made with a different LPA, which are paired with three comparative SMC formulations with the same LPA but without the metal salt.

TABLE 1D

Viscosity Over Time of Certain Comparative Formulations

| Elapsed Time in | Viscosity of Comparative Formulations in Poise @ 32° C. | | | | | |
|---|---|---|---|---|---|---|
| Hours | C-1 | B-1 | C-3 | D | C-4 | E |
| 0 | 240 | 752 | 176 | 1,100 | 310 | 800 |
| 1 | 1,024 | 2,700 | 2,000 | 4,240 | 2,000 | 2,560 |
| 48 | 200,000 | 82,000 | 290,000 | 86,000 | 85,000 | 67,000 |

As can be seen from Table 1D, formulations A, D and E of the present invention have a viscosity after one hour of maturation substantially greater than corresponding comparative formulations C-1, C-3 and C-4, respectively, during the same time period. Those formulations of the present invention again have a substantially lower viscosity than the corresponding comparative formulations C-1, C-3 and C-4 after 48 hours' maturation. This demonstrates the beneficial effect of the present invention on the maturation profile, namely faster initial maturation followed by slower maturation thereafter, with formulations containing different LPAs.

Additional SMC formulations to demonstrate the stability of the SMC formulations of the present invention relative to formulations which do not contain the metal salt are described in Table 2A below.

TABLE 2A

Formulations for Tables 2B, 2C and 2D

| | Parts by Weight of Components in SMC Formulations | | | | | |
|---|---|---|---|---|---|---|
| Component | C-5 | F | C-6 | G | C-7 | H |
| STYPOL ® 40-2783 | 60 | 60 | 60 | 60 | 60 | 60 |
| Polyvinyl Acetate LPA | 40 | 40 | — | — | — | — |
| Saturated Polyester LPA | — | — | 40 | 40 | — | — |
| Polystyrene LPA | — | — | — | — | 40 | 40 |
| Zinc Stearate | 4 | 4 | 4 | 4 | 4 | 4 |
| BYK 996 | 2 | 2 | 2 | 2 | 2 | 2 |
| Additional Styrene Monomer | 7 | 7 | 0 | 0 | 7 | 7 |
| p-Benzoquinone | 0.05 | 0.05 | 0.05 | 0.05 | 0.05 | 0.05 |
| Sartomer SR 705 | — | 7 | — | 7 | — | 7 |
| $CaCO_3$ Filler | 160 | 160 | 160 | 160 | 160 | 160 |
| PG 9160 | 5.32 | 5.32 | 5.32 | 5.32 | 5.32 | 5.32 |

The polyvinyl acetate LPA and the polystyrene LPA are the same as in Table 1A.

PG 9160 is 20 wt. % MgO in an unsaturated polyester paste available from PLASTICOLORS.

The viscosity of the above SMC formulations is measured at specific time intervals after the thickening agent is added and the data is reported in Tables 2B, 2C and 2D below.

Table 2B below shows maturation of SMC formulations containing NEULON® G, a polyvinyl acetate LPA.

TABLE 2B

Viscosity Over Time of SMC Formulations Containing Polyvinyl Acetate LPA

| | Viscosity of Formulations In Poise @ 32° C. | |
|---|---|---|
| Elapsed Time in Hours | C-5 (0 pbw) | F (7 pbw) |
| 0 | 180 | 480 |
| 1 | 5,100 | 7,500 |
| 24 | 270,000 | 95,000 |
| 48 | 320,000 | 150,000 |
| 72 | 320,000 | 200,000 |
| 96 | 340,000 | 220,000 |
| 120 | 380,000 | 230,000 |
| 240 | 440,000 | 295,000 |
| 480 | 1,500,000 | 360,000 |
| 720 | 1,600,000 | 375,000 |

The above data in Table 2B show that even when maturation of the SMC formulations is measured over a 720 hour (i.e., 30 day) period, the viscosity of the formulations containing metal salt according to the present invention remains substantially less than that of comparative formulation C-5 without the metal salt over the same time period.

Table 2C below shows maturation of SMC formulations containing a saturated polyester LPA.

TABLE 2C

Viscosity Over Time of SMC Formulations Containing Saturated Polyester LPA

| | Viscosity of Formulations in Poise @ 32° C. | |
|---|---|---|
| Elapsed Time in Hours | C-6 (0 pbw) | G (7 pbw) |
| 0 | 160 | 816 |
| 1 | 2,280 | 3,700 |
| 24 | 185,000 | 29,000 |
| 48 | 250,000 | 73,000 |
| 72 | 275,000 | 115,000 |
| 96 | 290,000 | 125,000 |
| 120 | 300,000 | 135,000 |
| 240 | 340,000 | 210,000 |
| 480 | 1,250,000 | 520,000 |
| 720 | 1,980,000 | 570,000 |

Table 2D below shows maturation of SMC formulations containing a polystyrene LPA. Polystyrene LPA is incompatible with other components of the SMC formulation, so that it has a tendency toward phase separation over time.

TABLE 2D

Viscosity Over Time of SMC Formulations Containing Polystyrene LPA

| | Viscosity of Formulations in Poise @ 32° C. | |
|---|---|---|
| Elapsed Time in Hours | C-7 (0 pbw) | H (7 pbw) |
| 0 | 352 | 720 |
| 1 | 1,600 | 2,610 |
| 24 | 62,000 | 23,200 |

TABLE 2D-continued

Viscosity Over Time of SMC Formulations Containing Polystyrene LPA

| | Viscosity of Formulations in Poise @ 32° C. | |
|---|---|---|
| Elapsed Time in Hours | C-7 (0 pbw) | H (7 pbw) |
| 48 | 78,000 | 51,000 |
| 72 | 92,000 | 86,000 |
| 96 | 110,000 | 100,000 |
| 120 | 115,000 | 110,000 |
| 240 | 135,000 | 145,000 |
| 480 | 830,000 | 360,000 |
| 720 | 900,000 | 380,000 |

The addition of metal salt to these SMC formulations also accelerates the initial maturation and yet permits a long time frame during which the viscosity is at a desired level for moldability.

The above formulations are made without reinforcing material to facilitate measurement of viscosity during the thickening process. When used to make molded articles, these formulations may be combined with at least one of the reinforcing materials described above, such as fiberglass roving, to make a more typical SMC. An example of such a formulation with metal salt alongside a comparative formulation without the metal salt is shown in Table 3A below.

TABLE 3A

Formulations for Table 3B

| | Parts by Weight of Components in SMC Formulations | |
|---|---|---|
| Component | C-8 | J |
| STYPOL ® 40-2783 | 60 | 60 |
| Polyvinyl Acetate LPA | 40 | 40 |
| Zinc Stearate | 5 | 5 |
| BYK 996 | 2 | 2 |
| Additional Styrene Monomer | 10 | 10 |
| Terbutyl Perbenzoate | 1.35 | 1.35 |
| p-Benzoquinone | 0.03 | 0.03 |
| Sartomer SR 705 | — | 7 |
| $CaCO_3$ Filler | 170 | 170 |
| PG 9160 | 5.32 | 5.32 |
| Fiberglass Roving made by Owens Corning | 20 wt % based on total weight of the SMC | 20 wt % based on total weight of the SMC |

Formulations C-8 and J are each molded in a flat panel compression press mold in which the male part of the mold is at 145 C. and the female part of the mold is at 150 C. so that the expected time interval from injection to cure is 3 minutes, at the pressures shown in Table 3B below to determine the effect of the compression molding process. The results are shown in Table 3B below.

TABLE 3B

Compression Molding Results with Comparative Formulation C-8 and Formulation J of Present Invention

| Pressure (psi) | Degree of Mold Filling | |
| --- | --- | --- |
|  | C-8 | J |
| 750 | filled | filled |
| 500 | filled | filled |
| 250 | unfilled | filled |
| 200 | unfilled | filled |
| 150 | unfilled | filled |
| 100 | unfilled | filled |
| 50 | unfilled | filled |

The above data show that when the SMC contains metal salt according to the present invention, the mold can be filled at just 50 psi and cured in just 3 minutes. Without the metal salt, the same SMC could not fill the mold at a pressure less than 500 psi.

The preceding examples are for illustrative purposes only, and these examples are not to be construed as a limitation upon the invention as described in the following claims.

What is claimed is:

1. A polyester resin-based molding composition comprising:
   (A) at least one unsaturated polyester resin having an acid number of at least about 10;
   (B) at least one ethylenically unsaturated monomer copolymerizable with the unsaturated polyester resin;
   (C) at least one thickening agent which is an oxide or hydroxide of magnesium, calcium, barium, or zinc or a mixture thereof; and
   (D) at least one multivalent metal salt of a nonfatty acid or anhydride, wherein the at least one ethylenically unsaturated monomer (B) and the at least one metal salt (D) are selected to be different from each other.

2. The composition of claim 1, wherein the at least one thickening agent comprises magnesium oxide.

3. A polyester resin-based molding composition comprising:
   (A) at least one unsaturated polyester resin having an acid number of at least about 10;
   (B) at least one ethylenically unsaturated monomer copolymerizable with the unsaturated polyester resin;
   (C) at least one thickening agent comprising an oxide or hydroxide of a Group I, II or III metal; and
   (D) at least one multivalent metal salt of a nonfatty acid or anhydride, wherein the metal is $Zn^{2+}$, $Mg^{2+}$ or $Ca^{2+}$, or a combination thereof,
   wherein the at least one ethylenically unsaturated monomer (B) and the at least one metal salt (D) are selected to be different from each other.

4. The composition of claim 3, wherein the at least one metal salt (D) is zinc acrylate.

5. A polyester resin-based molding composition comprising:
   (A) 10 to 30 wt % of at least one unsaturated polyester resin having an acid number of at least about 10;
   (B) 7 to 20 wt % of at least one ethylenically unsaturated monomer copolymerizable with the unsaturated polyester resin;
   (C) 0.1 to 5 wt % of at least one thickening agent comprising an oxide or hydroxide of a Group I, II or III metal;
   (D) 0.2 to 10 wt % of at least one multivalent metal salt of a nonfatty acid or anhydride, wherein the metal salt is zinc acrylate;
   (E) 3 to 30 wt % of at least one thermoplastic low profile additive;
   (F) 20 to 50 wt % of at least one filler; and
   (G) 10 to 50 wt % of at least one reinforcing material,
   wherein the at least one ethylenically unsaturated monomer (B) and the at least one metal salt (D) are selected to be different from each other.

6. The composition of claim 5, wherein the zinc acrylate is dispersed in the composition as finely divided particles such that at least 50 wt % of the particles have a particle size less than 5 microns.

7. A process for producing a molded part comprising:
   (A) forming a polyester-based curable molding composition according to claim 3 into a desired shape in a mold under an elevated pressure and
   (B) heating the formed composition in the mold at an elevated temperature, wherein the metal salt (D) of the molding composition is zinc acrylate dispersed in the molding composition as finely divided particles such that at least 50 wt % of the particles have a particle size less than 5 microns.

8. A process for producing a molded part comprising:
   (A) forming a polyester-based curable molding composition according to claim 3 into a desired shape in a mold under an elevated pressure not to exceed about 100 psi and
   (B) heating the formed composition in the mold at an elevated temperature not to exceed about 200° F.,
   wherein the metal salt (D) of the molding composition is zinc acrylate dispersed in the molding composition as finely divided particles such that at least 50 wt % of the particles have a particle size less than 5 microns.

9. A method for controlling maturation of polyester resin-based molding compositions having an unsaturated polyester resin in which at least about 25% of the end groups are acidic, an ethylenically unsaturated monomer copolymerizable with the unsaturated polyester resin and a thickening agent comprising an oxide or hydroxide of a Group I, II or III metal comprising dispersing in the molding composition at least one multivalent metal salt of a nonfatty acid or anhydride, wherein the viscosity of the molding composition 100 hours after addition of the thickening agent is not greater than about 160,000 Poise and the viscosity of the molding composition 360 hours after addition of the thickening agent is not greater than about 240,000 Poise and the viscosity of the molding composition one hour after addition of the thickening agent is at least 50% greater than the same composition without the metal salt and the at least one multivalent metal salt of a nonfatty acid or anhydride is zinc acrylate dispersed in the molding composition as finely divided particles such that at least 50 wt % of the particles have a particle size less than 5 microns.

10. A method for controlling maturation of polyester resin-based molding compositions having an unsaturated polyester resin in which at least about 25% of the end groups are acidic, an ethylenically unsaturated monomer copolymerizable with the unsaturated polyester resin and a thickening agent comprising an oxide or hydroxide of a Group I, II or III metal comprising dispersing in the molding composition at least one multivalent metal salt of a nonfatty acid or anhydride, wherein the at least one multivalent metal salt of a nonfatty acid or anhydride is zinc acrylate dispersed in the molding composition as finely divided particles such that at least 50 wt % of the particles have a particle size less than 5 microns.

* * * * *

UNITED STATES PATENT AND TRADEMARK OFFICE
CERTIFICATE OF CORRECTION

PATENT NO. : 6,225,380 B1  Page 1 of 1
DATED : May 1, 2001
INVENTOR(S) : Erwoan Pezron and Frederic Bauchet It is certified that error appears in the above-identified patent and that said Letters Patent is hereby corrected as shown below:

Title page,
Item [73] Assignee: replace "Cook Composites and Polymers Co., Kansas City, MD (US)" with -- Cook Composites and Polymers Co., Kansas City, MO (US) --.

Column 6,
Line 26, replace "$M_{c1}^{c2+}(R(C(O)O)_{a1}^{31})_{a2}$" with -- $M_{c1}^{c2+}(R(C(O)O)_{a1}^{-})_{a2}$ --.

Signed and Sealed this

Eighth Day of January, 2002

Attest:

JAMES E. ROGAN
Attesting Officer   Director of the United States Patent and Trademark Office